Dec. 18, 1962 W. M. DAVIS 3,069,575
ELECTRIC MOTOR
Filed Oct. 13, 1958
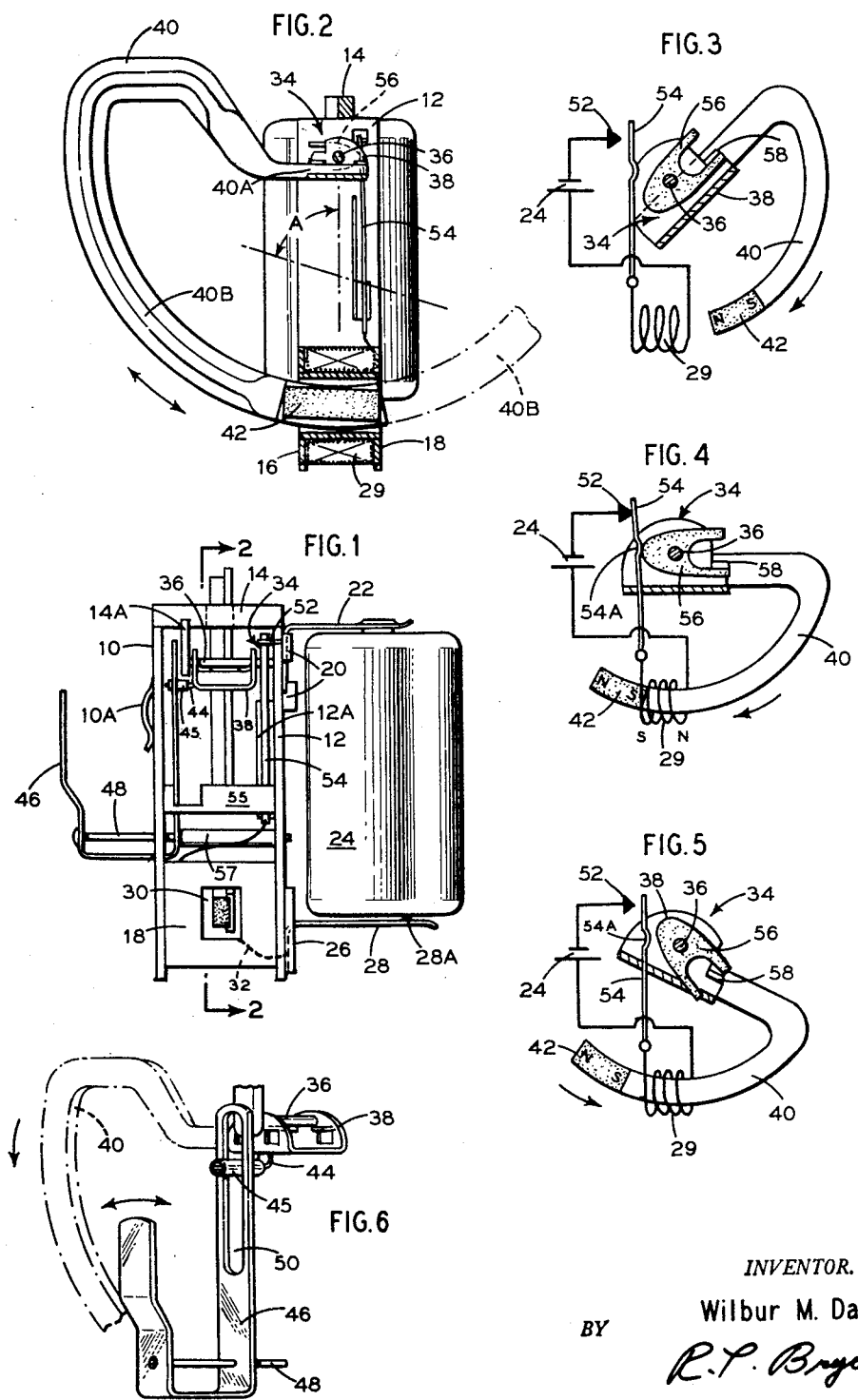
INVENTOR.
Wilbur M. Davis
BY
R. P. Bryan
ATTORNEY United States Patent Office
3,069,575
Patented Dec. 18, 1962

3,069,575
ELECTRIC MOTOR
Wilbur M. Davis, 63 86th St., Brooklyn 9, N.Y.
Filed Oct. 13, 1958, Ser. No. 767,001
4 Claims. (Cl. 310—34)

This invention relates in general to a small electric motor of the type used in advertising displays.

Small motors of this type are commonly powered by small dry cell batteries. As most of these displays are set into place and are thereafter unattended, it is important that the motor operate with the minimum current use, so as to get the maximum use of the display for each battery. These devices are arranged such that the force for operating the motor is obtained by an electromagnetic coil operating on a permanent magnet to either repell or attract the permanent poles. Many of these devices are so arranged that while one pole of the magnet is being principally acted upon by the magnetic field, the second pole creates a disturbance in the field thereby lessening its effect and the efficiency of the conversion of electrical energy to mechanical energy.

Most of the prior art devices utilize metal parts and frames which in addition to disturbing the magnetic field are also expensive. As the display motor is generally discarded after its use in a display, it is important that the motor be inexpensive and efficient.

Accordingly, the present invention provides a display motor arranged to produce an oscillating motion wherein the structural parts of the motor are made of non-conductive material and are thus inexpensively manufactured.

Further, the invention provides an electric motor having a non-conductive C-shaped arm with one end pivotally mounted between two parallel plates and the other end arranged as an arcuate section. A permanent magnet is mounted on the end of the arm and arranged such that the arm swings back and forth and passes through a hollow electromagnetic coil. An electric circuit for passing current through the coil and a switch means are provided to energize the coil at a predetermined point on one swing of the magnet through the core and at a second separate point on the second swing whereby the magnet is repelled twice each cycle in opposite directions.

Further, the electric circuit of the motor is timed such that only one pole of the magnet is acted upon by the magnetic force of the coil. This is accomplished by arranging the motor so that the pole of the permanent magnet which is opposite from the pole which has already passed through the coil is the one acted upon.

Additionally, the invention provides a specific arrangement of timing device and a single pair of electric contacts which are so proportioned as to place the contacts together twice each swing cycle and at different positions of said swinging arm with respect to the electric coil.

Moreover, the invention supplies a motion transmission means for producing a motion in an oscillating driven member which is proportional to the motion produced by the swinging arm, but not necessarily equal thereto.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which is illustrated and described a preferred embodiment of the invention.

In the drawings:

FIG. 1 is a left hand side view of the motor.

FIG. 2 is a section taken along the lines 2—2 of FIG. 1.

FIGS. 3, 4, and 5 are semi-schematic diagrams illustrating the operation of the motor.

FIG. 6 is an isometric view in a large scale of the motion transmission portion of the motor.

The motor of the present invention as illustrated in the drawings has a pair of generally upright parallel plates 10, 12 joined at the top by a bridge section 14 and at the bottom by a pair of parallel connecting sections 16, 18. The side plates, bridge section 14 and connection portions 16 and 18 are preferably formed of a non-conducting plastic material. Such plastic may be molded and fabricated by any of the well-known methods to produce an integral structure.

Side plate 12 at the upper portion thereof has a pushed out section 20 to form a clip into which is placed a brass conductor 22 adapted to receive the upper end of a flashlight type battery 24. The lower end of the plate 12 has a second clip holding portion 26 formed therein to receive a second electric conductor clip 28 with a protuberance 28A thereon for contacting the lower portion of the battery 24.

Securely fixed between the plates 10 and 12 and bounded by the connecting portions 16 and 18 is an electromagnetic wire coil 29 having its axis and air core 30 parallel to the plane of the side plates 10 and 12 and positioned centrally between the plates. One end of the coil is connected by a wire 32 to the lower clip 28.

Located between the plates 10 and 12 and immediately adjacent plate 12 is switch means (generally indicated by the arrow and numeral 34) adapted to energize the coil at predetermined times as will be explained more completely hereinafter. A shaft 36 is mounted having one end journaled in the side plate 12 and its opposite end in a support extension 14A extending downwardly from the bridge section 14. Pivotally mounted on the shaft 36 is a metal arm clip 38 which in turn is arranged to receive one end of a C-shaped arm 40. The C-shaped arm has a flat end portion 40A which is securely mounted in the clip 38 and the other end 40B is in an arcuate shape arranged such that when the arm swings about the shaft 36, the arcuate portion 40B of the arm passes through the core 30 of the coil 29. A straight permanent magnet 42 is fixed to the end portion 40B of the arm and is of a size such that it substantially fills the air core 30 of the coil 29 as it passes therethrough.

The arm clip 38 has an extension 44 (see FIGS. 1 and 6) extending towards the plate 10 on which there is affixed a small cylindrical frictionless body 45 such as nylon. Thus the extension 44 moves in an arcuate path about the shaft 36 as the arm 40 swings back and forth through the coil 29.

A generally U-shaped driven member 46 is pivotally mounted on a pin 48 to the side plates 10 and 12, so that the one leg of the U-shaped member is outside of the plate 10 and the inner leg portion of the member is between the plates 10 and 12 and immediately adjacent plate 10. A longitudinal slot 50 is cut in the inner leg of the U-shaped member 46 and the nylon cylinder 45 on the extension 44 is adapted to lie within the slot. Accordingly, as the nylon member oscillates back and forth in an arcuate path, motion is transmitted to the U-shaped member and results in its oscillation in a manner proportional but not equal to the oscillation of the C-shaped arm 40.

The switch means 34 referred to above includes a single pair of electrical contacts consisting of a fixed straight contact 52 which is electrically connected to the upper clip 22 and an upright flexible blade 54 which is attached at its lower portion to a non-conductive bridge member 55 between the plates 10 and 12. The blade contact 54 is electrically connected to one lead of the coil 29 by a wire 57. Plate 12 is formed with a protruding section 12A which contacts the lower portion of the flexible blade contact 54 to restrain its motion and serve as a protection against accidental bending of the blade which would result in inoperativeness thereof. The electric contacts 52, 54 are arranged such that the flexible blade 54 is normally urged out of contact with the stationary contact 52 by its inherent elasticity.

A timing device is provided which is proportioned to place the contacts 52 and 54 together twice each swing cycle of the arm 40 and at different positions of the swinging arm with respect to the coil 18. The timing device is best illustrated with reference to FIGS. 2 and 3 to 5. The device consists of a non-conductive cam 56 pivotally and freely mounted on the shaft 36 and having a U-shaped end portion in the bight of which is disposed an extension 58 from the arm clip 38. The non-conductive cam is preferably made of nylon but may be a vulcanized or plastic impregnated fiber. The flexible contact blade 54 is arranged with a protuberance 54A thereon at a position immediately adjacent the cam 56, such that as the cam 56 is oscillated about the shaft 36 by the motion of the arm 40 the cam forces the flexible blade contact 54 into electric engagement with the stationary contact 52. The U-shaped portion of the cam 56 allows the cam to move freely and unrestrained on the shaft 36 throughout a portion of the arc of the arm 40. However, the extension 58 will eventually contact one of the legs of the U-shaped end portion of the cam 56 and carry the cam with it, thus forcing the cam to actuate the flexible blade 54.

Although the motor is illustrated in FIG. 2 in a vertical position, the motor is preferably mounted in a slight angle A from the vertical so that when the arm is acted upon by gravity the magnet on the end of the arm is positioned within the core 30 of the coil 29 when the arm 40 is at rest. In this position the contacts 52 and 54 are disengaged, thus the motor battery will not run down should the motor stop or be stopped for any reason.

As this motor is intended primarily for advertising display purposes, it has provided thereon a clip such as 10A attached to the plate 10 for receiving or attaching the motor to a display. Quite obviously, the motor may be attached to displays in any well known manner which would not affect the oscillation of the motor.

It is contemplated that the U-shaped oscillated driven member 46 may be of a small height and thus be pinned at a position closer to that of the shaft 36. Thus the motion transmission mechanism described above would produce a greater arc of oscillation. Those skilled in the art will recognize that with the reduction mechanism illustrated most any arc velocity or swing may be obtained by modifying the dimensions of the mechanism. Moreover, an oscillating member may be driven directly by the motion of the arm 40 by simply extending the length of the shaft 36 to hold an oscillating member.

Perhaps a better understanding will be gained of the invention by describing its principle of operation with respect to FIGS. 3 to 5.

Therein there is shown semi-schematically an electric circuit wherein a coil 29 is connected in series with the battery 24 and with the single pair of contacts 52 and 54. With the battery arranged as illustrated the coil 29 when energized will have a north and south pole as indicated. The permanent magnet 42 is placed on the arm 40 so that when the magnet is centered within the core of the coil 29 its north pole is opposite the south pole of the coil.

A typical cycle of the motor will be illustrated by starting with FIG. 3 wherein the magnet 42 is outside of the coil and the cam 56 is not engaging the flexible blade 54. As the arm 40 swings the magnet into the coil, the pivoting of the arm about the shaft 36 causes the extension 58 to drive the cam 56 to contact the protuberance 54A on the contact 54 and close the electric circuit, as indicated in FIG. 4, just as the south pole of the permanent magnet is emerging from the coil 18. Thus the south pole of the coil is opposite the south pole of the magnet and causes a repulsion. Due to the momentum of the arm 40, the repulsion would be in the direction as indicated by the arrow in FIG. 4. When the momentum of the arm 40 is lost due to the action of gravity and it starts in the opposite direction, the extension 58 no longer operates on the cam 56 and the arm swings without necessarily moving the cam 56 until the extension 58 is contacting the cam 56 at the opposite leg of its U-shaped portion. It is then that the extension 58 drives the cam into contact with the protuberance 54A and again causes the electric current to energize the coil. At this time the north pole of the permanent magnet is just emerging from the north end of coil 29 and is repelled thereby. It can thus be seen from the description that the switch means 34 and the timing mechanism described causes the electric circuit of the motor to be energized at different positions of the swinging arm 40 with respect to the electric coil 29 for each cycle (two swings) of the arm.

It should be noted that the arrangement is such that the pole of the permanent magnet which is not being acted upon by the electric coil is completely out of the strong portion of the magnetic field created by the coil and that, therefore, the coil will have its maximum efficiency in repelling the permanent magnet.

An important feature of the motor is that the switch means 34 is protected from accidental misalignment and consequent inoperativeness by the provision of the protuberance 12A on side plate 12.

While in accordance with the provisions of the statutes, there is illustrated and described herein specific embodiments of my invention, those skilled in the art will understand that changes may be made in the form of the invention covered by my claims, and that certain features of the invention may sometimes be used to advantage without a corresponding use of the other features.

I claim:

1. A small electric motor comprising a pair of parallel spaced non-conducting plates, a C-shaped arm having one end pivotally mounted on a shaft between said plates and the other end arranged as an arcuate section, an elongated permanent magnet mounted on said arm, a hollow electromagnetic coil mounted between said plates and arranged to have said magnet and arcuate portion of said C-shaped arm pass through its core as the arm swings, a driven member mounted on at least one of said plates and adapted to be oscillated, motion transmission means for oscillating said driven member in response to motion of said C-shaped arm, an electrical circuit for passing current through said coil, and switch means in said circuit energizing said coil to produce a repelling force on only one pole of said magnet on each passage of the magnet through the coil, said switch means including a single pair of contacts and a timing device proportioned to place said contacts together twice each swing cycle and at different positions of said swinging arm with respect to said coil, said timing device comprising a non-conductive cam in contact with one of said contacts and pivotally mounted on said shaft, and a cam driving means fixed to said arm and arranged to restrain said cam to cause said contacts to close twice each swing cycle of said arm at different predetermined positions.

2. A small electric motor comprising a pair of parallel spaced non-conducting plates, a C-shaped arm having one end pivotally mounted on a shaft between said plates and the other end arranged as an arcuate section, an elongated permanent magnet mounted on said arm, a hollow electromagnetic coil mounted between said plates and arranged to have said magnet and arcuate portion of said C-shaped arm pass through its core as the arm swings, a driven member mounted on at least one of said plates and adapted to be oscillated, motion transmission means for oscillating said driven member in response to motion of said C-shaped arm, an electrical circuit for passing current through said coil, and switch means in said circuit energizing said coil to produce a repelling force on only one pole of said magnet on each passage of the magnet through the coil, said switch means including a single pair of contacts and a timing device proportioned to place said contacts together twice each swing cycle and at different positions of said swinging arm with respect to said coil, said timing device comprising a non-conductive cam in contact with one of said contacts and pivotally mounted on said shaft and having a U-shaped end portion, and a cam driving means fixed to said arm between the legs of said U-shaped end portion and arranged to restrain said cam to cause said contacts to close twice each swing cycle of said arm at different predetermined positions.

3. A small electric motor comprising a pair of parallel spaced non-conducting plates, a C-shaped arm having one end pivotally mounted on a shaft between said plates and the other end arranged as an arcuate section, an elongated permanent magnet mounted on said arm, a hollow electromagnetic coil mounted between said plates and arranged to have said magnet and arcuate portion of said C-shaped arm pass through its core as the arm swings, a driven member mounted on at least one of said plates and adapted to be oscillated, motion transmission means for oscillating said driven member in response to motion of said C-shaped arm, an electrical circuit for passing current through said coil, and switch means in said circuit energizing said coil to produce a repelling force on only one pole of said magnet on each passage of the magnet through the coil, said switch means including a single pair of contacts and a timing device proportioned to place said contacts together twice each swing cycle and at different positions of said swinging arm with respect to said coil, said timing device comprising a cam in contact with one of said contacts and pivotally mounted on said shaft and having a U-shaped end portion, and a non-conductive cam driving means fixed to said arm between the legs of said U-shaped end portion and arranged to restrain said cam to cause said contacts to close twice each swing cycle of said arm at different predetermined positions, one of said electric contacts being a flexible blade with a cam contacting protuberance thereon of a greater dimension than the normal opening of said contacts.

4. An electric motor according to claim 3 having a member wider than said blade attached to one of said parallel plates and extending generally parallel to the blade for at least a major portion of the blade length, said last named member positioned between said blade and the outer edge of said parallel plate, whereby said blade is protected from accidental bending.

References Cited in the file of this patent

UNITED STATES PATENTS

| | | |
|---|---|---|
| 2,686,883 | Horbach | Aug. 17, 1954 |
| 2,810,083 | Dunay | Oct. 15, 1957 |
| 2,890,355 | Berthel | June 9, 1959 |
| 2,922,901 | Wengel | Jan. 26, 1960 |
| 2,933,629 | Hurler | Apr. 19, 1960 |

FOREIGN PATENTS

| | | |
|---|---|---|
| 173,457 | Switzerland | Feb. 16, 1935 |